United States Patent [19]

Arand et al.

[11] 4,208,386

[45] Jun. 17, 1980

[54] UREA REDUCTION OF $NO_x$ IN COMBUSTION EFFLUENTS

[75] Inventors: John K. Arand, Rancho Palos Verdes; Lawrence J. Muzio, Laguna Niguel; John G. Sotter, Mission Viejo, all of Calif.

[73] Assignee: Electric Power Research Institute, Inc., Palo Alto, Calif.

[21] Appl. No.: 663,415

[22] Filed: Mar. 3, 1976

[51] Int. Cl.² ............................................ B01D 53/34
[52] U.S. Cl. ................................................... 423/235
[58] Field of Search ...................... 423/235, 239, 351

[56] References Cited

U.S. PATENT DOCUMENTS

| | | | |
|---|---|---|---|
| 3,565,575 | 2/1971 | Warshaw | 423/235 |
| 3,801,696 | 4/1974 | Mark | 423/235 |
| 3,846,981 | 11/1974 | Paczkowski | 423/235 |
| 3,867,507 | 2/1975 | Myerson | 423/235 |
| 3,900,554 | 8/1975 | Lyon | 423/235 |
| 4,061,597 | 12/1977 | Goldstein et al. | 423/235 X |

FOREIGN PATENT DOCUMENTS

| | | | |
|---|---|---|---|
| 1388669 | 3/1975 | United Kingdom | 423/235 |
| 186985 | 11/1966 | U.S.S.R. | 423/235 |

OTHER PUBLICATIONS

Hach's Chem. Dict.–4th Ed.–1969–pp. 702, 703.
Perry's Chem. Engr. Handbook–4th Ed.–1963–pp. 3-42.

*Primary Examiner*—G. O. Peters
*Attorney, Agent, or Firm*—Bertram I. Rowland

[57] ABSTRACT

Method for reducing $NO_x$ in combustion effluents comprising introducing urea at elevated temperatures in the presence of oxygen, either as a solid or solution in amounts sufficient to reduce the $NO_x$ concentration. Conveniently, the urea may be introduced as a solid powder or as a solution in a hydroxylic solvent, at temperatures in excess of 1300° F. and in the presence of at least 0.1 volume percent oxygen.

This invention was made under contract with or supported by the Electric Power Research Institute.

9 Claims, No Drawings

UREA REDUCTION OF NO$_x$ IN COMBUSTION EFFLUENTS

BACKGROUND OF THE INVENTION

1. Field of the Invention

A major contributor to air pollution are the combustion products of fossil fuels. Included among the combustion products is nitric oxide, which is involved in the formation of photochemical smog. The nitric oxide is oxidized in the atmosphere to nitrogen dioxide, which subsequently reacts with hydrocarbons in the presence of sunlight to form photochemical smog.

Combustion products from automotive internal combustion engines, fossil fuel power plants, process furnaces, incinerators, and the like all contribute to the production of nitric oxide. Control of nitric oxide production has been directed toward modifications in the combustion process or removal of the nitric oxide from the combustion products prior to discharge into the atmosphere.

There have been numerous efforts to effectively remove nitric oxide from combustion effluents. One of the major difficulties has been that many of these devices only operate well with relatively large oxygen excess. This is true of power plant boilers, process furnaces, gas turbines, diesels, stratified charge engines, and spark ignition engines with thermal reactors. These devices generally contain flue gases with oxygen concentrations from 0.1 to 10 volume percent and nitric oxide concentrations from 100 to 4000 ppm. Thus, oxygen is present in large excess with respect to nitric oxide. While it is well known how to reduce both nitric oxide and oxygen with large quantities of a reducing agent, desirably, a process should reduce nitric oxide selectively.

2. Description of the Prior Art

U.S. Pat. No. 3,900,554 discloses the use of ammonia for reducing nitric oxide.

SUMMARY OF THE INVENTION

Combustion effluents containing oxygen and oxides of nitrogen are contacted with urea, either in solid form or in solution in an hydroxylic solvent, at an elevated temperature, the urea being in an amount sufficient to significantly reduce the oxides of nitrogen concentration in the effluent. Temperatures of at least 1300° F. are required in the presence of an auxiliary reductant and at least about 1600° F. in the absence of the auxiliary reductant. The urea is found to selectively reduce the oxides of nitrogen.

DESCRIPTION OF THE SPECIFIC EMBODIMENTS

The subject invention provides a method for selective reduction of oxides of nitrogen, particularly nitric oxide, in the presence of oxygen at elevated temperatures in combustion effluents. The combustion effluent may be from any combustion device. This includes utility, power plant boilers, industrial and commercial boilers, process furnaces, MHD combustors, stationary and mobile gas turbine engines, stationary and mobile spark ignited and diesel engines, incinerators, and any combination thereof, such as supplementary-fired combined cycle power plants.

The combustion effluent must be at a temperature of at least about 1300° F. and preferably at least about 1500° F., more preferably, at least about 1600° F., generally not exceeding 2000° F., preferably not exceeding 1900° F. In the lower region of the temperature range, an auxiliary reductant, e.g. an organic hydroxylic solvent should be present, particularly a reducing material which is oxidizable at temperatures less than 1500° F. e.g. alkanols of from 1 to 3 carbon atoms, particularly methanol.

In carrying out the subject invention, the urea is injected into the combustion effluent stream so as to provide substantially uniform distribution of the urea in the effluent stream. By combustion effluent is intended those gases which flow out from a region of combustion, either from flame or catalytic combustion.

The combustion effluent should have at least about 0.1 volume percent oxygen and not more than about 20 volume percent oxygen, preferably having from about 0.1 to 10 volume percent oxygen. The amount of urea which is employed will generally be from about 0.1 to 10 moles of urea per mole of nitric oxide, preferably from about 0.5 to 2 moles of urea per mole of nitric oxide.

The pressure at which the process is carried out is not critical and may be varied widely. Generally, the pressures will be from about 0.1 to 100 atm.

The residence time of the reaction will generally range from about 0.001 to 10 seconds.

The urea which is injected into the stream may be injected as a finally divided powder, molten urea as a fine spray, or a urea solution as a fine spray.

The urea solution may be varied widely as to concentration, up to saturation, but generally not less than about 10 weight percent, preferably not less than about 20 weight percent. Single solvents may be employed, or mixtures of solvents. Desirably, a reducing compound, such as an alkanol of from 1 to 3 carbon atoms e.g. methanol may be employed. Other solvents include water, ketones of from 3 to 4 carbon atoms, and the like.

Besides a reducing solvent, other reducing compounds may also be employed in combination with the urea. Such materials include paraffinic, olefinic and aromatic hydrocarbons and mixtures thereof e.g. gasoline and fuel oil, oxygenated hydrocarbons, including lower mono- and dibasic acids, e.g. formic and oxalic acids, substituted hydrocarbons, carbon monoxide and hydrogen. Of this group, hydrogen is the most preferred.

The use of the reducing materials allows operation at temperatures in the range of about 1300° to 1600° F. If other than hydrogen is employed, desirably the amount of such reducing material will be limited, so that there is a net excess of oxygen in the combustion effluent and the production of air pollutants due to incomplete oxidation is minimized. The amount of hydrogen should also be limited, since it is found that hydrogen reduces the selectivity of the urea. The mole ratio of hydrogen to urea should be less than about 10, and preferably less than about 3.

The injection of the urea into the combustion effluent stream may be in a single charge or may be incrementally added. Generally, the urea will be added in not more than about 5 increments, using not more than about 3 increments. That is, the urea may be added at various stages along the flow path of the combustion effluent or at a single stage. At each stage, the same requirements of temperature and oxygen concentration are necessary. The oxygen may be present as a result of the combustion process being carried out in the presence of excess oxygen or by the addition of oxygen.

In order to demonstrate the subject invention, a number of examples were carried out.

EXAMPLE I

Known amounts of natural gas and air where combusted in an 8" diameter combustion tunnel. Nitric oxide was added to the air to control the amount of nitric oxide at the point where the urea was injected. The temperature at the point of the urea injection was measured with a thermocouple and controlled by varying the amounts of fuel and air burned. The amount of oxygen present was also controlled by varying the relative amount of air and natural gas. The urea was contacted with the stream of combustion products by dissolving in water and spraying the urea solution into the combustion tunnel. During these experiments, the water injection rate was held constant and the amount of dissolved urea varied. The following table indicates the results.

TABLE I

| Excess $O_2$ vol % (dry) | NO ppm (dry) | Temp. °F. | Residence Time sec. | Urea NO mol ratio | Output NO ppm |
|---|---|---|---|---|---|
| 2.2 | 580 | 1280 | 0.36 | 0.5 | 570 |
|  |  |  |  | 1.2 | 580 |
|  |  |  |  | 2.4 | 565 |
|  |  |  |  | 5.5 | 570 |
| 1.9 | 560 | 1545 | 0.24 | 0.5 | 520 |
|  |  |  |  | 1.0 | 530 |
|  |  |  |  | 2.0 | 515 |
|  |  |  |  | 5.1 | 510 |
| 1.9 | 495 | 1745 | 0.16 | 0.5 | 290 |
|  |  |  |  | 1.0 | 232 |
|  |  |  |  | 1.9 | 165 |
|  |  |  |  | 3.8 | 116 |
| 2.5 | 490 | 1830 | 0.14 | 0.4 | 167 |
|  |  |  |  | 0.9 | 81 |
|  |  |  |  | 1.7 | 25 |
|  |  |  |  | 3.4 | 24 |
| 2.5 | 505 | 1865 | 0.13 | 0.5 | 160 |
|  |  |  |  | 1.1 | 65 |
|  |  |  |  | 2.2 | 24 |
|  |  |  |  | 5.4 | 22 |
| 2.6 | 530 | 1940 | 0.10 | 0.5 | 440 |
|  |  |  |  | 1.1 | 235 |
|  |  |  |  | 2.2 | 125 |
|  |  |  |  | 5.5 | 125 |

The above data demonstrate that the urea is capable of reacting with nitric oxide despite the presence of a substantial amount of oxygen, so that the urea is not exhausted by reacting with the oxygen.

In the next study, the equipment employed in an earlier study was used and the temperature range employed was a preferred range of 1600° to 1900° F. The excess oxygen level was varied and it was found that the level of excess oxygen in the combustion products was not critical to the nitric oxide reduction. The following table indicates the results.

TABLE II

Fuel: Natural gas
Oxidizer: Air
Temperature: 1830° F.

| [Urea] [NO] | NO, ppm output | | | |
|---|---|---|---|---|
|  | Input: $O_2$ = 1.0% | $O_2$ = 2.5% | $O_2$ = 4.1% | $O_2$ = 5.6% |
| 0 | 510 | 490 | 430 | 370 |
| 0.4 | — | 167 | — | — |
| 0.5 | 154 | — | 156 | 141 |
| 0.9 | 78 | 81 | 81 | — |
| 1.0 | — | — | — | 77 |
| 1.7 | — | 25 | — | — |
| 1.8 | 18 | — | 26 | — |
| 1.9 | — | — | — | 27 |
| 3.4 | — | 24 | — | — |
| 3.5 | 20 | — | — | — |
| 3.6 | — | — | 21 | — |
| 3.8 | — | — | — | 20 |

Following the procedures already described, urea was introduced as a solution in water-methanol mixtures or the individual solvents.

TABLE III

Combustion products of natural gas and air
Excess oxygen: 4.3%
[Urea]/[NO$_{input}$] = 0.4 (molar basis)

| Urea dissolved in | | | Input | | Output | |
|---|---|---|---|---|---|---|
| % water | % methanol | Temp °F. | $O_2$(%) | NO(ppm) | $O_2$(%) | NO(ppm) |
| 100 | 0 | 1280 | 2.2 | 580 | 2.2 | 570 |
| 100 | 0 | 1280 | 4.2 | 550 | 4.2 | 535 |
| 75 | 25 | 1305 | 3.4 | 550 | 2.0 | 515 |
| 50 | 50 | 1330 | 3.4 | 550 | 1.1 | 415 |
| 25 | 75 | 1360 | 3.4 | 550 | 0.4 | 380 |
| 100 | 0 | 1545 | 3.9 | 515 | 3.7 | 475 |
| 75 | 25 | 1400 | 4.3 | 510 | 3.2 | 430 |
| 50 | 50 | 1420 | 4.3 | 510 | 2.4 | 440 |
| 25 | 75 | 1445 | 4.3 | 510 | 1.5 | 385 |
| 0 | 100 | 1445 | 4.3 | 510 | 1.2 | 360 |

The above data demonstrate that the temperature at which the urea is brought into contact with the stream of combustion products can be reduced when an additional reducing compound such as methanol is introduced with the urea.

Finally, the urea was injected into the combustion products of natural gas and air in a pulverized form. At a temperature of 1650° F., with 2.7 volume percent excess oxygen and 334 ppm NO, the NO was reduced to 260 ppm with no change in the excess oxygen level, when a small amount of powdered urea was aspirated into the tunnel. At a temperature of 1760° F., 2.7 volume percent excess oxygen, and 340 ppm NO level, the NO was reduced to 215 ppm when the powdered urea was added to the tunnel. At 1370° F., 2.8 volume percent excess oxygen, and 400 ppm NO, NO is reduced to 350 ppm upon the addition of a small amount of powdered urea.

The subject invention provides a number of advantages in employing as a reductant a solid, inert, non-corrosive material which is easily handled, stored, and can be readily introduced into a combustion products stream either as a solid or in solution, particularly with ancillary reducing material e.g. methanol. The urea can be safely employed with mobile combustion devices, being stored and used either as a solution or as a dry powder.

The urea can be introduced into various parts of combustion devices without significant corrosive effects. For example, the urea can be injected in the superheater region of a boiler, or in an exhaust manifold or combustion chamber of a diesel engine.

Although the foregoing invention has been described in some detail by way of illustration and example for purposes of clarity of understanding, it will be obvious that certain changes and modifications may be practiced within the scope of the appended claims.

What is claimed is:

1. A process for selectively reducing $NO_x$ in a combustion effluent containing $NO_x$ comprising:

contacting a $NO_x$ containing effluent stream in the presence of oxygen with urea, wherein said urea is present in an amount of about 0.1 to 10 moles per moles $NO_x$ at a temperature in the range of about 1600° to 2000° F. with the proviso that when an ancillary reducing material is introduced concurrently with the said urea, said temperature is in the range of about 1300° to 2000° F.

2. A method according to claim 1, wherein an ancillary reducing material is introduced concurrently with said urea and said temperature is in the range of about 1300° to 2000° F.

3. A method according to claim 2, wherein said ancillary material is methanol.

4. A method according to claim 2, wherein said effluent contains 0.1 to 10 volume percent of oxygen.

5. A method according to claim 1, wherein said urea is present in an amount of from about 0.5 to 2 moles per mole of $NO_x$.

6. A method according to claim 1, wherein said urea is introduced as a fine molten spray into said effluent stream.

7. A method according to claim 1, wherein said urea is introduced as a solution.

8. A method according to claim 7, wherein said solution is aqueous.

9. A method according to claim 7, wherein said solution is alkanolic.

* * * * *